United States Patent [19]
McCubbin

[11] Patent Number: 4,506,555
[45] Date of Patent: Mar. 26, 1985

[54] CABLE TENSION MEASURING DEVICE

[75] Inventor: Charles E. McCubbin, Mustang, Okla.

[73] Assignee: Baker Drilling Equipment Company, Orange, Calif.

[21] Appl. No.: 540,152

[22] Filed: Oct. 7, 1983

[51] Int. Cl.³ ............................................. G01L 5/06
[52] U.S. Cl. .............................. 73/862.46; 73/862.47
[58] Field of Search ........... 73/862.39, 862.46, 862.47, 73/862.48; 116/212, DIG. 34

[56] References Cited

U.S. PATENT DOCUMENTS

| | | |
|---|---|---|
| 1,722,036 | 7/1929 | Byl . |
| 2,285,471 | 6/1942 | Sturgess . |
| 3,174,334 | 3/1965 | McKernan . |
| 3,618,379 | 11/1971 | Lipton . |
| 3,653,258 | 4/1972 | King . |
| 3,679,808 | 7/1972 | Rohner et al. ............... 73/862.46 |
| 3,868,662 | 2/1975 | Russell, Jr. . |

FOREIGN PATENT DOCUMENTS 861989  9/1981  U.S.S.R. ........................ 73/862.39

Primary Examiner—Charles A. Ruehl
Attorney, Agent, or Firm—Norvell & Associates

[57] ABSTRACT

An apparatus for measuring tension in cables or chains comprises a unitary structure which may be entirely formed by welding and bending operations. An elongated resiliently deformable rod has its opposed ends bent laterally in opposite directions into hook-shaped formations to engage a section of a cable in which the tension is to be measured, causing the cable to assume a non-linear, generally helical configuration when the apparatus is assembled thereto. An adjustable height pad may be attached to the center of the bar to engage the cable and increase its helical angle. An indicator bar, having indications provided thereon, is disposed in generally radial relationship to the rod adjacent one end thereof. A cantilever pointer has one end welded to the rod remote from the indicating bar and the pointed end disposed adjacent the indicating bar. As tension is applied to the cable, the rod is bent in a longitudinal arc and the pointed end of the cantilever pointer moves along the indicating bar to indicate the degree of tension applied to the cable.

13 Claims, 6 Drawing Figures

CABLE TENSION MEASURING DEVICE

BACKGROUND OF THE INVENTION

1. FIELD OF THE INVENTION:

The invention relates to a device for measuring the amount of tension applied to a tensile force transmitting element, such as a flexible cable, chain or band.

2. DESCRIPTION OF THE PRIOR ART:

There are many industrial applications where it is desirable to know with reasonable accuracy the amount of tension application to a cable, chain or band, or similar tensile force transmitting element. In this manner, it is assured that the tensile transmitting element will not be subjected to excess force resulting in its breakage or, equally important, that sufficient tension exists in the tension transmitting element to enable it to perform a particular function, for example, a chain holding a load on a truck bed.

Numerous patents have been issued on devices for measuring tension in cables. A large group of such patents, represented by the disclosures of U.S. Pat. No. 1,722,036 to BLY; U.S. Pat. No. 3,174,334 to McKERNAN; and U.S. Pat. No. 3,653,258 to KING, disclose a tension measuring device which is applied to a stressed cable, and an actuating member imposes a lateral force on the stressed cable. The amount of deflection of the stressed cable in response to the lateral force is measured and this measurement provides an indication of the degree of tension in the stressed cable.

This type of device is particularly applicable to measuring stress already existing in a stressed cable, i.e., the measuring apparatus can be applied to the stressed cable and a measurement taken without the stress being removed from the cable.

There are numerous industrial applications wherein the opportunity exists for applying the stress measuring device to the cable prior to the application of substantial stress thereto. This technique permits a substantial degree of simplification of the measuring apparatus. For example, U.S. Pat. No. 3,868,662 to RUSSELL discloses an E-shaped support through which an unstressed band is inserted. The application of stress to the band causes a longitudinal deformation of the E-shaped support and the extent of this deformation is either indicated by the closing of a switch carried by the support or visually by an indicator bar mounted on the support and cooperating with another element of the support for indicating the degree of support deformation.

In any event, the prior art devices are characterized by being relatively complicated, involving a number of parts, some of which are relatively movable, and being expensive to manufacture. The need exists for an inexpensive, rugged device suitable for use in adverse environmental conditions, such as well drilling rigs, which may be applied to a wide range of sizes of cables, chains or the like, and will nevertheless provide a reliable indication of the amount of tension applied to the cable, chain or similar tensile force transmitting element.

SUMMARY OF THE INVENTION

The invention provides a stress measuring apparatus for a flexible cable or similar tensile force transmitting element, comprising a unitary assemblage, preferably formed by welding, which is attachable to the cable when the cable is relatively relaxed. The assemblage incorporates a resiliently deformable, elongated rod having its end portions transversely bent in diametrically opposite directions to define cable engaging hook portions projecting transversely from the rod in opposite directions. A cable abutment pad may be welded to a central portion of the rod and the aforedescribed apparatus is assembled to the cable, prior to the application of a high degree of tension thereto, so that the cable is threaded through the device in a non-linear, generally helical configuration. Thus, the application of stress to the cable causes the cable to tend to assume a linear configuration and concurrently causes a torsional and longitudinal deformation of the rod. The hook portions are of such size as to accomodate a range of sizes of the cable in which the stress is to be measured.

An indicating bar is welded to one end of the resiliently deformable rod and lies immediately adjacent and transverse to the end of the linear portion of the rod. The indicating bar carries indications along its length which can be readily visually observed. The indications can obviously be calibrated to provide quantitative readings if such are desired.

A cantilever type indicating pointer has one end welded to the rod at a point remote from the indicating bar, and the free end cooperates with the indicating bar when the cable is stressed to provide a reliable indication of the cable stress.

Other advantages of the invention will be readily apparent to those skilled in the art from the following description, taken in conjunction with the annexed sheets of drawings on which is shown a preferred embodiment of the invention.

DESCRIPTION OF THE PREFERRED EMBODIMENT

Figure 1:
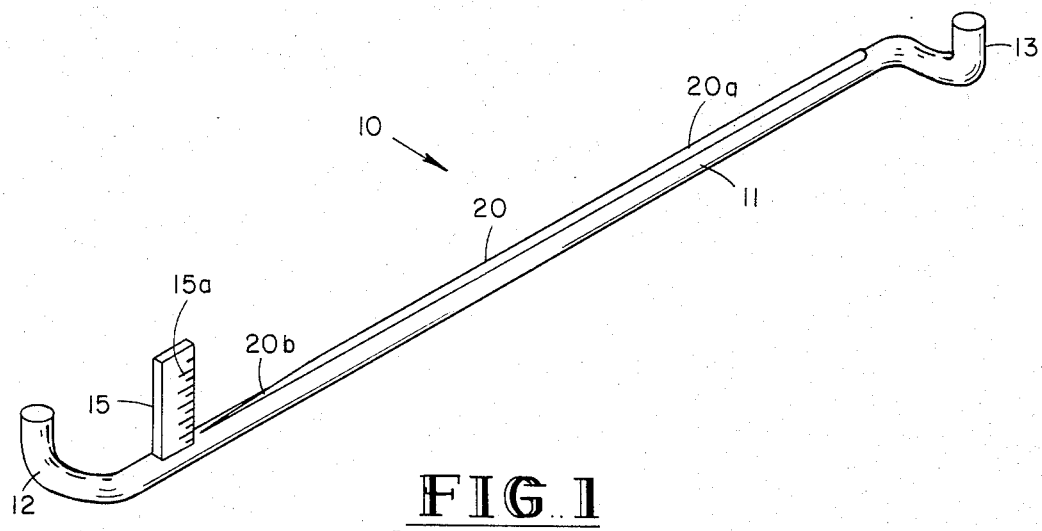
FIG. 1 is a perspective view of a tension indicating apparatus embodying this invention.

As clearly shown in FIG. 1, a cable tension indicating device embodying this invention is a highly simplistic structure. Briefly, the tension measuring apparatus 10 comprises a resiliently deformable, elongated rod 11 preferably formed of steel or similar metal having resilient deformation characteristics. The opposite ends 12 and 13 of the rod 11 are respectively bent into generally hooked-shaped configurations which are respectively disposed in transverse relationship to the rod portion 11 and project outwardly therefrom in radially opposite directions.

An indicator bar 15 has its one end attached, as by welding, to one end of rod 11, adjacent to but longitudinally spaced from the hook 12. Indicator bar 15 projects radially relative to the rod 11 and is disposed in generally perpendicular relationship to hook portion 12.

Spaced indications 15a are provided on the indicator bar 15.

To cooperate with the indicating marks 15a, an indicating pointer 20 is secured in cantilever relationship to the rod 11. Thus, one end portion 20a of the indicating pointer 20 is attached, as by welding, to a portion of the rod 11 remote from the indicating bar 15 while the other pointed end 20b of the indicating pointer 20 is disposed relatively adjacent to the indicating bar 15. In the unstressed condition of the rod 11, the indicating pointer lies in juxtaposed relationship thereto, as shown in FIG. 1.

Figure 2:
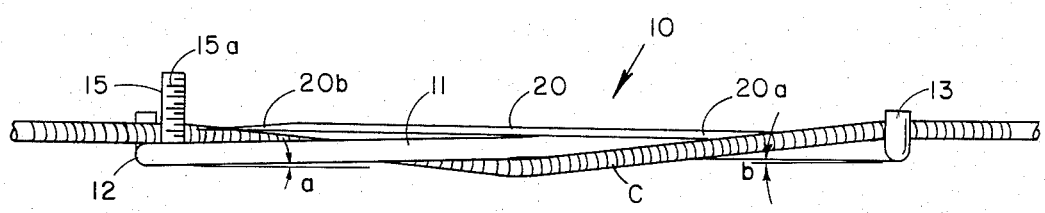
FIG. 2 is an elevational view illustrating the assemblage of the tension measuring device to a cable.

Referring now to FIG. 2, the assembly of the tension measuring apparatus 10 to a length of cable C is illustrated. As is readily apparent from FIG. 2, the cable length C is trained through the two oppositely projecting, curved hook elements 12 and 13. Thus, the cable length assumes a non-linear configuration which is of generally helical shape. It will be noted that the periphery of the cable C lies adjacent the indicating bar 15 and the hook elements automatically centers the rod 11 relative to the cable C.

Referring now to FIG. 2, when an unknown degree of tension is applied to the cable C, the cable attempts to assume a more linear configuration. This results in a longitudinal bending and torsional stressing of the rod 11 and hence longitudinally bends of the cable C with respect to the rod 11 as indicated respectively by the angles a and b on FIG. 2. The free end 20b of the pointer 20 will move relative to the axis of the rod 11, producing a definite change in its radial displacement relative to rod 11 which can be visually read from the indicating marks 15a on indicator bar 15.

The fact that the resiliently deformable rod 11 is subjected to both longitudinal and torsional deformation by the application of stress to the cable C inherently results in the size of such rod being substantially smaller than would be required if the stressed cable merely bent the rod longitudinally. Thus, a relatively modest diameter rod can effect measurement of very highly stressed cables.

As previously mentioned, the indicating marks 15a can be calibrated to read a prescribed amount of tension for each size of cable or chain to be measured. Since the curved hooks 12 and 13 are of substantial lateral extent, it is apparent that a relatively wide range of cable or chain sizes may be accomodated in the device.

Figure 6:
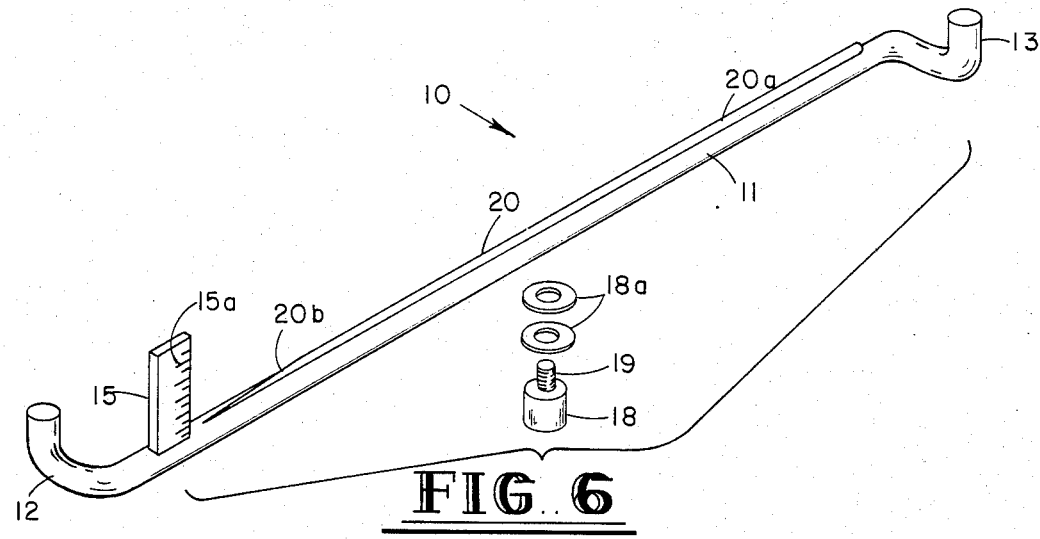
FIG. 6 is an exploded view similar to FIG. 3 but illustrating an adjustable pad.
Figure 3:
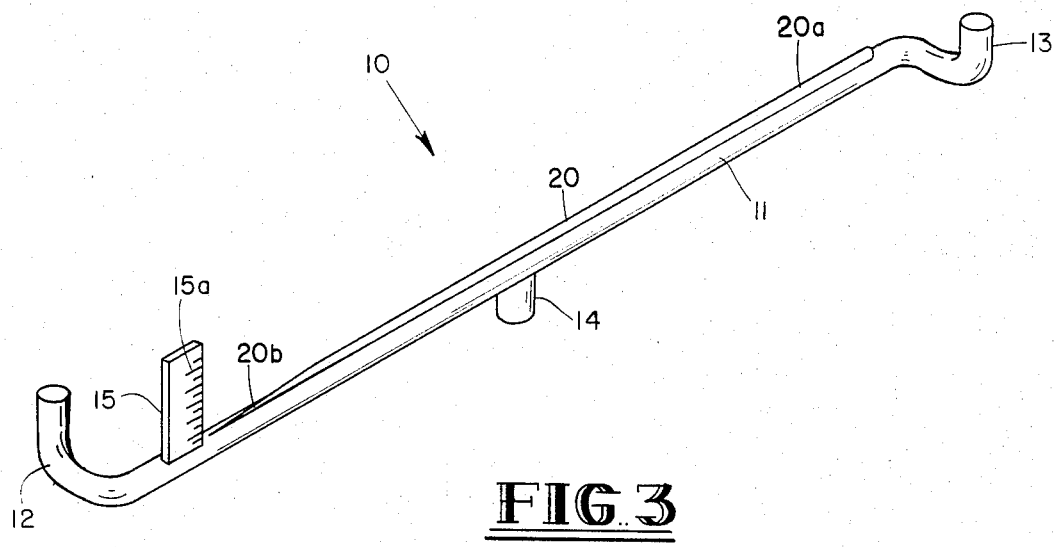
FIG. 3 is a perspective view of a modified form of tension indicating device incorporating this invention.
Figure 4:
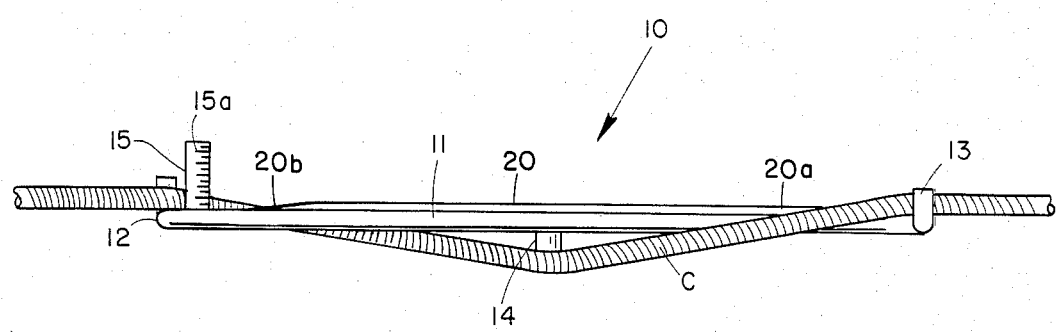
FIG. 4 is an elevational view illustrating the initial assemblage of the modified tension measuring device of FIG. 3 to a cable.
Figure 5:
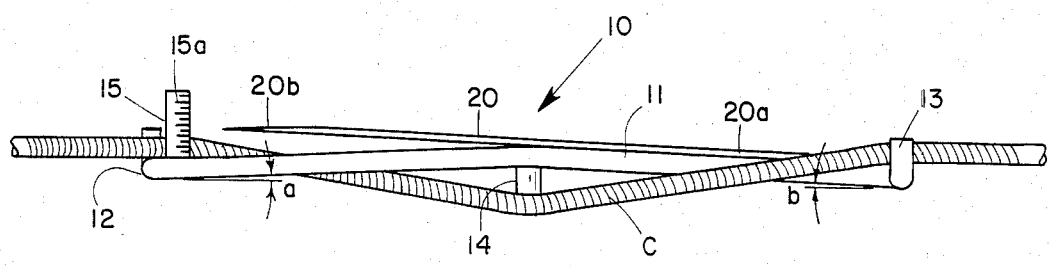
FIG. 5 is a view similar to FIG. 4 but indicating the deformation of the modified tension indicating device in response to the application of tension to the engaged cable.

Referring now to FIGS. 3, 4 and 5, there is shown a modification of this invention wherein a pad 14 is provided on the central portions of the rod 11 to impart a higher degree of helical twist to the cable or chain C to which the device is applied. As illustrated in FIGS. 3, 4 and 5, such pad may comprise a mass of metal suitably attached, as by welding, to the center of rod 11. Alternately, as illustrated in FIG. 6, the radial height of the pad with respect to the axis of the rod 11 may be varied by providing an adjustable height pad 18. Pad 18 is secured to rod 11 by a bolt 19 which traverses one or more spacing washers 18a to permit convenient adjustment of the effective radial height of the pad 18.

As will be recognized by those skilled in the art, the increase in helical angle of the cable C produced by pad 14 or 18 will impart a greater degree of bending to the rod 11 of the indicating device 10. Thus, a greater displacement of the free end 20b of the indicator pointer 20 will be produced.

One of the outstanding advantages of a tension indicating device embodying this invention is its ready applicability to any form of tensile transmitting element. The curved configuration of the oppositely directed hooks 12 and 13 insure that the cable, chain or band is secured to the rod 11, with the rod 11 being automatically disposed in a centralized position with respect to the stressed tensile element. Thus, the possibility of the indicating device being laterally displaced and violently ejected from the stressed tensile element is eliminated.

Those skilled in the art will also recognize that other forms of indicating apparatus may be applied to the rod 11 to indicate the bending of such rod by the stress in the cable to which the rod is applied. For example, a dial type indicator could be utilized which is actuated by the deflection of the pointer 20 relative to the rod 11. The essential feature of this invention, however, is the utilization of a single rod as the primary element for engaging and deforming the stressed tensile element into a helical configuration.

Those skilled in the art will also recognize that the aforedescribed cable tension measuring apparatus may be manufactured with absolute minimum cost and yet provide a tension measuring device that is functional with a high degree of accuracy. It can be applied to any form of flexible tensile transmitting element, such as a steel or plastic cable, chain, a steel or aluminum band, electrical conductors or even rope, and will be effective for a wide range of sizes. All such elements are hereinafter characterized by the term "cable". The only essential characteristic of the tensile transmitting element is that it be sufficiently flexible to permit it to be assembled on the tension measuring device in a relaxed position.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. Apparatus for indicating the degree of tension applied to a length of flexible cable comprising a resiliently deformable elongated rod; cable engaging hook elements projecting transversely in diametrically opposite directions from each end of said rod, whereby the engagement of said hook elements with the cable deflects the cable into a helical configuration; and means for indicating the longitudinal bending of said rod in response to the application of tensile stress to said cable.

2. The apparatus of claim 1 wherein said hook elements are integrally formed by permanently bending the ends of said elongated rod.

3. The apparatus of claim 1 wherein said means for indicating the longitudinal bending of said rod comprises a transverse bar secured to said rod and carrying spaced graduations, and a cantilevered pointer having one end secured to said rod at a point remote from said transverse bar and a pointed end disposed adjacent said graduations.

4. The apparatus of claim 1 plus radially projecting spacer means secured to the center of said rod to abuttingly engage the cable to which said rod is applied to increase the helical deformation of said cable.

5. The apparatus of claim 4 wherein said radially projecting spacer means includes means for adjusting the effective radial height of said spacer means relative to said rod.

6. Apparatus for indicating the degree of tension applied to a length of flexible cable comprising a resiliently deformable rod; transversely disposed means on each end of said rod abutting said cable to deflect it into a helical configuration surrounding said rod intermediate said transversely disposed means; cable abutment means rigidly secured to a medial portion of said rod to abuttingly engage the cable, whereby the application of tension to the cable concurrently produces a straightening of the helical portion of the cable and a longitudinal deformation of said resiliently deformable rod; an indicator bar rigidly secured to said rod and projecting transversely relative to said rod, and pointer means secured to said rod and cooperable with said indicator bar to indicate the change in position of the cable relative to said rod produced by applied tension to the cable.

7. The apparatus of claim 6 wherein said transversely disposed means comprise an integrally formed, transversely disposed hook portion of each end of said rod, said hook portions being respectively disposed in opposite radially projecting relationship.

8. The apparatus of claim 6 wherein said cable abutment means comprises a pad welded to the center of said rod.

9. The apparatus of claim 6 wherein said cable abutment means is adjustable in radial height relative to the axis of said rod.

10. Apparatus for indicating the degree of tension applied to a length of flexible cable comprising a resiliently deformable rod; transversely disposed means on each end of said rod abutting said cable to deflect it into a non-linear configuration adjacent said rod and intermediate said transversely disposed means; cable abutment means rigidly secured to a medial portion of said rod to abuttingly engage the cable, whereby the application of tension to the cable concurrently produces a straightening of the non-linear portion of the cable and longitudinal deformation of said resiliently deformable rod; an indicator bar rigidly secured to said rod and projecting substantially transversely to said rod; a plurality of spaced indications on said indicating bar; and a pointer having one end thereof rigidly secured to said rod at a position remote from said indicating bar, whereby the deformation of said rod produced by increased tension in the cable moves said pointed end of said pointer relative to said indications.

11. The apparatus of claim 10 wherein said transversely disposed means comprise an integrally formed, transversely disposed hook portion on each end of said rod, said hook portions being respectively disposed in opposite radially projecting relationship, thereby imparting a helical shape to the non-linear portion of the cable.

12. The apparatus of claim 10 wherein said cable abutment means comprises a pad welded to the center of said rod.

13. The apparatus of claim 10 wherein said cable abutment means is adjustable in radial height relative to the axis of said rod.

* * * * *